(12) United States Patent
Needham et al.

(10) Patent No.: US 8,645,553 B2
(45) Date of Patent: *Feb. 4, 2014

(54) PARTIALLY REPLICATED, LOCALLY SEARCHED PEER TO PEER FILE SHARING SYSTEM

(75) Inventors: Bradford H. Needham, North Plains, OR (US); Mark Lewis, La Grande, OR (US)

(73) Assignee: Intel Corporation, Santa Clara, CA (US)

( * ) Notice: Subject to any disclaimer, the term of this patent is extended or adjusted under 35 U.S.C. 154(b) by 611 days.

This patent is subject to a terminal disclaimer.

(21) Appl. No.: 12/655,420

(22) Filed: Dec. 29, 2009

(65) Prior Publication Data

US 2010/0106778 A1 Apr. 29, 2010

Related U.S. Application Data

(63) Continuation of application No. 09/878,023, filed on Jun. 6, 2001.

(51) Int. Cl.
*G06F 17/30* (2006.01)
(52) U.S. Cl.
USPC .......................................... 709/229; 709/227
(58) Field of Classification Search
USPC .......... 709/229, 227, 217–219; 707/673, 736, 707/741, 828, 830
See application file for complete search history.

(56) References Cited

U.S. PATENT DOCUMENTS

| 5,806,065 | A | 9/1998 | Lomet |
| 6,334,124 | B1 | 12/2001 | Bouchard et al. |
| 6,785,691 | B1 | 8/2004 | Hewett et al. |
| 7,353,252 | B1 * | 4/2008 | Yang et al. ..................... 709/204 |
| 2002/0027567 | A1 | 3/2002 | Niamir |
| 2002/0033844 | A1 | 3/2002 | Levy et al. |
| 2002/0138744 | A1 | 9/2002 | Schleicher et al. |
| 2002/0188735 | A1 | 12/2002 | Needham et al. |
| 2002/0188841 | A1 | 12/2002 | Jones et al. |
| 2002/0194256 | A1 | 12/2002 | Needham et al. |
| 2004/0070678 | A1 | 4/2004 | Toyama et al. |
| 2004/0148287 | A1 | 7/2004 | Manion et al. |
| 2009/0198822 | A1 * | 8/2009 | Needham et al. ............. 709/229 |

OTHER PUBLICATIONS

U.S. Appl. No. 60/290,972, pp. 1-15; filed May 16, 2001.*
Final Office Action Received for U.S. Appl. No. 09/878,023, mailed on May 4, 2005, 7 pages.
Non Final Office Action Received for U.S. Appl. No. 09/878,023, mailed on Sep. 24, 2004, 7 pages.

(Continued)

*Primary Examiner* — Kenneth R Coulter
(74) *Attorney, Agent, or Firm* — Barre Law Firm, PLLC

(57) ABSTRACT

Controlling access to a file includes selecting, by a first network node in a peer to peer file sharing system, a file to make available for sharing with a second network node in the peer to peer file sharing system, the file being stored on the first network node. The first network node sends index information associated with the selected file to the second network node. The second network node subsequently performs a local search of a set of index information associated with a set of files stored in the peer to peer file sharing system to locate the index information for the selected file; and requests a copy of the selected file from the first network node using the index information.

20 Claims, 2 Drawing Sheets

(56) References Cited

OTHER PUBLICATIONS

Non Final Office Action Received for U.S. Appl. No. 12/384,577, mailed on Jun. 5, 2013, 12 pages.

Final Office Action Received for U.S. Appl. No. 12/384,577, mailed on Mar. 17, 2011, 12 pages.

Non Final Office Action Received for U.S. Appl. No. 12/384,577, mailed on Sep. 20, 2010, 12 pages.

Decision on Appeal Received for U.S. Appl. No. 09/878,023 mailed on Oct. 27, 2010, 10 pages.

* cited by examiner

PARTIALLY REPLICATED, LOCALLY SEARCHED PEER TO PEER FILE SHARING SYSTEM

RELATED APPLICATIONS

This application is a Continuation of U.S. patent application Ser. No. 09/878,023, entitled " Partially Replicated, Locally Searched Peer to Peer File Sharing System," filed on Jun. 6, 2001. This application is related to U.S. patent application Ser. No. 12/384,577, entitled "Partially Replicated, Locally Searched Peer to Peer File Sharing System," filed on Apr. 7, 2009. These applications are entirely incorporated by reference.

BACKGROUND

1. Field

The present invention relates generally to distributed file systems and protocols and, more specifically, to file security in peer to peer media sharing systems.

2. Description

There are at least several peer to peer media sharing systems in current use on computer networks such as the Internet. Napster™ is a popular system wherein a central server performs all searches for requested files and returns the names of files and their network addresses on each system in the network that match the request. In Gnutella™, another popular peer to peer system, users make search requests that are propagated throughout a network and perform searches on each machine in the network. In FreeNet™, there is no search ability. To retrieve a file using FreeNet, the user must already know the file's true name, which may be extremely difficult to guess.

Both Gnutella and Napster store index information to support searches outside the requester's machine (e.g., on other machines in the network), causing scarce network bandwidth to be consumed every time any user in the network performs a search for a desired file. Neither Gnutella nor Napster provide any hiding of files in the network. In either system, making a file available to one user of the network makes it available to all users of the network. This may be undesirable for personally-created files, because the owner may wish to make only certain files available to certain people, but not to the world at large. Napster or Gnutella could be modified to associate file access permissions with index information, but this produces other problems. In Gnutella, because index information is replicated as files are shared among network nodes, the system would then have to solve the problem of maintaining consistent permissions in replicated indices. In Napster, after adding permissions to each file in the main database, the system would still require a central server with the associated disadvantages of a lack of fault tolerance and difficulty in maintaining scalability.

For peer to peer file sharing systems supporting the sharing of personally created media such as digital photographs, videos, and music, the lack of privacy inherent in these systems is troubling to some users. Furthermore, the search capabilities of such systems are inefficient.

BRIEF DESCRIPTION OF THE DRAWINGS

The features and advantages of the present invention will become apparent from the following detailed description of the present invention in which.

DETAILED DESCRIPTION

Figure 1:
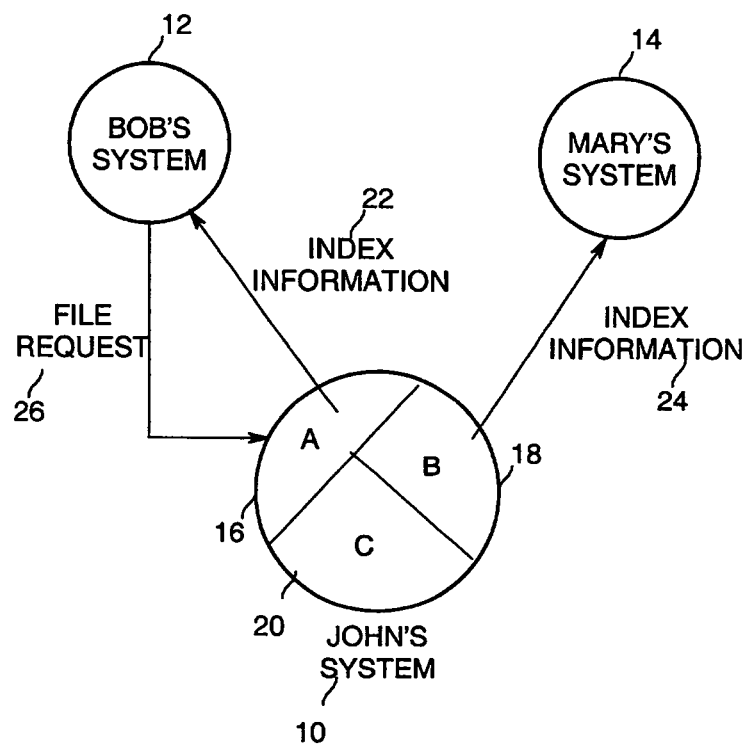
FIG. 1 is a diagram of an example portion of a network illustrating controlled file sharing according to an embodiment of the present invention.

An embodiment of the present invention is a method of controlling sharing and searching of file information in a distributed file system operating as a private peer to peer network. In one embodiment, the invention may be implemented in a peer to peer media sharing system. In typical peer to peer media sharing systems such as Napster and Gnutella, the file data being shared among users is professionally created and widely distributed data (e.g., music files encoded in the Moving Pictures Experts Group (MPEG) audio layer 3 (MP3) format, digital video clips encoded in various formats, etc.). That is, the data may be posted and made available in multiple copies and at multiple network nodes within the distributed network. In contrast, in embodiments of the present invention, the system may be designed to selectively share individually created and narrowly distributed data. For example, the data being shared may be digital photographs or digital videos created by an individual for sharing only among his or her immediate social connections such as family and friends, but not with others. The present invention takes advantage of the single point of creation of this type of data (and single point of posting the data) to control sharing of the knowledge of the existence of files through a private peer to peer network. By controlling the sharing of the knowledge of the files on the network, privacy may be maintained.

In embodiments of the present invention, index information about files may be communicated among nodes of the network separately from the file data. The index information may be selectively propagated through a public network such as the Internet only between nodes operated by people having social connections (e.g., friends and family), and the file data may be selectively propagated more narrowly in the network, again only between friends and family. This in effect creates a private peer to peer network within a larger public network (such as the Internet, for example).

In the present invention, individually created and narrowly distributed media may be shared with selected people such that the media is largely undiscoverable by others. There are many prior art systems where all index information is shared with other parties (such as distributed text retrieval systems), and in which the subsets of index information are chosen for reasons other than privacy (for example, mobile computer synchronization systems). In contrast, embodiments of the present invention share selected subsets of index information in a distributed file system with selected other users in a controlled manner, thereby improving the security of shared files of the peer to peer network and the privacy interests of the users of the ad hoc private peer to peer network. Since in the present invention index information is shared only about files that one user wishes to make available to another user, users who do not receive the index information about a file cannot easily discover that file's existence, and thus cannot request that file from the first user's system. Embodiments of the present invention also perform file searches locally, reducing consumption of network bandwidth, yet preserving advantageous fault tolerance of a configuration not requiring a central server.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention comprise a network of file storage systems, each file storage system having index information describing one or more of the files on that one system and a (possibly empty) subset of files on other systems in the network. Each file may have a globally unique identifier associated with the file that may be very difficult to guess. The identifier may be part of the index information for the file. Each system has the ability to communicate with a subset of nodes in the network (for example, a user of a file storage system may communicate with his or her friends and family via their file storage systems). In various embodiments, a file storage system may be a personal computer (PC), an engineering workstation, a set top box, a personal digital assistant (PDA), a cellular phone, a mainframe computer, an Internet appliance, or any other device for storing and accessing file data via a communications network. A file storage system may also be referred to herein as a network node. Each network node may communicate with one or more other network nodes. The network may be a local area network (LAN), a wide area network (WAN), the Internet, or any other communications network. The files may store any digitally represented data, for example, audio data, video data, image data, or text data. In one embodiment, the file data comprises digital photographs and the file storage systems (nodes) are PCs coupled to one another via the Internet, although the invention is not limited in scope in this respect. In this embodiment, each PC stores the owner's collection of personally created digital photographs and videos, and photographs and videos that friends or family members have shared with the owner.

FIG. 1 is a diagram of an example portion of a network for controlled file sharing according to an embodiment of the present invention. This example illustrates multiple network nodes interacting with each other in a privately organized peer to peer network based on social connections. In one embodiment, the private peer to peer network may be formed to communicate digital photographs amongst network members, with each digital photograph being stored in a file, although the data shared may be of any type or for any purpose. In this example, John 10 knows Bob 12 and Mary 14. Of course this example is merely for illustrative purposes and does not limit the scope of the invention. The circles shown in FIG. 1 represent the file storage systems (network nodes) of the people discussed in the example, yet there may be many more network nodes in the network that are not shown.

Assume for the sake of illustration that John has some personally created media that he wishes to share with selected other people he knows. The files may be stored on John's system 10. As part of creating each file storing the data (e.g., digital photograph data), Bob assigns the file a globally unique and very hard to guess identifier (for example, file #13572431234890), using any of several well known methods for generating globally unique and/or very hard to guess identifiers. Identifiers for the files may be chosen to be very hard to guess in order to reduce the ability of another network node to request copies of files for which the node has not received index information about the files. John decides to make part of his media collection, part A 16, available for access by his friend Bob 12, and another part, part B 18, available for access by his friend Mary 14. John also decides to keep another part, part C 20, private. In other words, John does not want to make any files in part C of his collection available for access by anyone (at least not to Bob or Mary at this point in time).

In order to selectively make certain files available for access by others in the private peer to peer network, John's system 10 sends index information 22 describing part A of his collection to Bob's system 12, and index information 24 describing part B of his collection to Mary's system 14. Note that the size of the index information communicated to the other network nodes is relatively small compared to the size of the files (photographs, videos, etc.) to be shared. The index information may comprise data such as, but not limited to, a unique and very hard to guess file identifier, a caption or title, an image thumbnail, a creation date, a creator name, file size, format type, and other identifying information. Of course, FIG. 1 describes merely one simplistic example, and with the present invention John's system could send index information for any possible subset of John's files to any one or more other users in the network, in any combination and at any time. The example shown in FIG. 1 implies that the files in part A are exclusive of the files in part B or part C, but the invention is not limited in scope in this respect; the parts of the file collections specified in any given set of index information sent to one or more network nodes may be overlapping.

At some time in the future, Bob may search his locally stored index information for some particular file or files. For example, suppose Bob is looking for all photographs taken on June 12 at Bob's birthday party, which was attended by John, Mary, and others. The locally stored index information may include index information about Bob's own files (which are stored on Bob's system), as well as index information about the files of others (which are not stored on Bob's system). The index information about the files of others may have been received from those friends and family members as described immediately above. In this example, the local search may return information about some of Bob's photographs, and about some of John's photographs, from part A 22 of John's collection, the index information for which was previously shared with Bob. Bob decides he wants to see a selected one of John's photographs from the party from John's collection that Bob knows about, so Bob's system 12 retrieves the globally unique identifier for the selected file from the associated index information stored locally on Bob's system. Bob's system then sends a file request 26 for the selected file from part A of John's collection (e.g., for file #42258543274590) to John's system. John's system fields the request and returns the requested file to Bob's system.

Notice that since Mary does not have index information about part A of John's collection, she cannot easily request any of those files (e.g., photographs), and is unaware that those files exist. Mary can only request files in part B of John's collection, because she only has index information, including the file identifiers, for files in part B. Bob cannot request any files from part B of John's collection, because he is unaware that they exist. Both Bob and Mary are unaware of the existence of part C of John's collection, which he has not shared with either person. Since the globally unique file identifiers are assigned such that they are very hard to guess, it may be very unlikely that Bob can guess the file identifier of a file in John's collection for which Bob has not been informed of the associated index information. Thus, the present system of selectively sharing index information may improve file security and user privacy. Note also that searches for index information for selected files are performed locally rather than being broadcast to all network nodes. No global searches for files may be allowed. Instead, file requests may be made only for files for which index information has been shared. Hence, the sending of index information operates to grant access to selected files. Each network node searches the index information stored locally to determine what files the node has been given access to on other nodes. In some embodiments, the propagation of the index information through nodes of the network may be limited in order to curtail widespread dissemination of the files.

Figure 2:
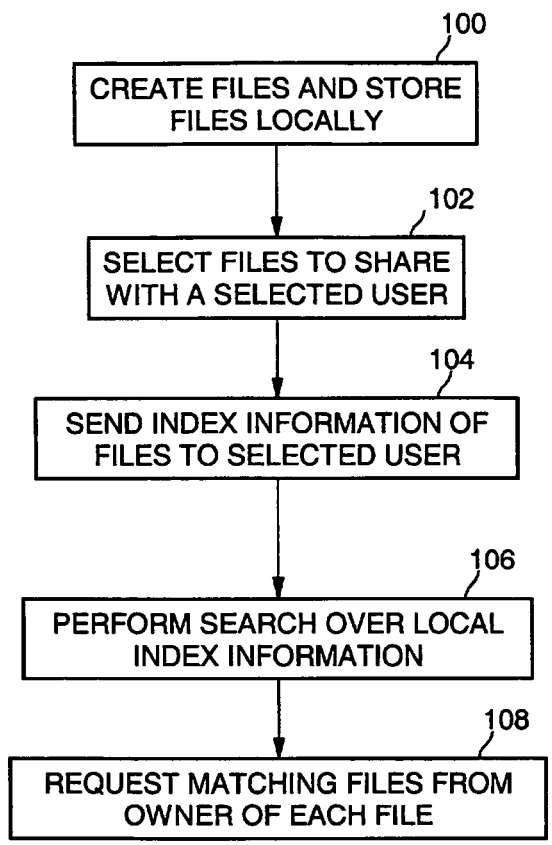
FIG. 2 is a flow diagram of file sharing processing according to an embodiment of the present invention.

FIG. 2 is a flow diagram of file sharing processing according to an embodiment of the present invention. At block 100, a first network node creates one or more files and stores the files locally at the first network node. The files may contain any data. Each file may be assigned a globally unique and very hard to guess identifier. At block 102, one or more files to be shared with a selected user (such as a friend or relative) may be selected. At block 104, index information for each of the files to be shared is created and sent to the selected user (i.e., the selected user's network node or file storage system). At a minimum, the index information includes the globally unique and very hard to guess identifier for the file. The sharing of index information may be performed for any number of network nodes, in any combination of sets of index information. The sharing of the index information may in some embodiments be only with people that have social connections (e.g., they are friends, family members, etc.). The set of index information that may be shared from one network node to another network node may be a subset of the index information for all files available in the peer to peer file sharing system. Blocks 100, 102, and 104 may be performed by a first network node that creates one or more files to be shared. In other embodiments, the index information may be propagated through the network to other nodes.

At block 106, a second network node that has received index information from another network node (which may or may not be the node that created the index information (e.g., the first network node)) performs a search over all local index information available to that second network node. The index information stored locally at the second network node in effect makes the second node aware of and grants access to files stored on the first network node and possibly other nodes. At block 108, the second network node requests one or more matching files from the owners of each file based on the file identifiers contained in the locally stored index information. Thus, the index information is used to obtain a copy of a selected file.

The present invention thus provides better privacy than existing peer to peer methods and systems. In Gnutella, for example, one cannot control who queries your publicly accessible file directories. In contrast, with the present invention, access may be granted only to those informed of the file identifiers via the sharing of index information. Blanket queries of file directories for index information or other file information may not be allowed. Instead, only requests for the actual file data may be supported. In some embodiments, either the files or the index information, or both, may be encrypted using known methods to provide additional security prior to sharing either the index information or the file with another network node.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. An article comprising:
    a non-transitory storage medium having a plurality of machine readable instructions, wherein when the instructions are executed by a processor, the instructions provide for controlling access to files by:
        selecting, by a first network node in a peer to peer file sharing system, a first file to make available for sharing with a second network node in the peer to peer file sharing system, the first file being stored on a file storage system accessible by the first network node, wherein the peer to peer file sharing system comprises the first network node, the second network node, and a third network node;
        selecting, by the first network node, a second file to make available for sharing with the third network node, the second file being stored on the file storage system accessible by the first network node;
        providing index information for the first file to the second network node only, without broadcasting the index information for the first file to any other network node in the peer to peer file sharing system;
        providing index information for the second file to the third network node only, without broadcasting the index information for the second file to any other network node in the peer to peer file sharing system;
        after the first network node has provided the index information for the first file to the second network node only, performing a local search on the second network node only, without using services from any other network node, to identify local and remote files of interest to a user of the second network node, wherein the remote files of interest comprise the first file; and
        after identifying local and remote files of interest to the user of the second network node, using the index information on the second network node for the first file to obtain the first file from the first network node.

2. The article of claim 1 wherein the index information for the first file comprises a globally unique identifier for the first file, and the globally unique identifier for the first file comprises a numeric file number for the first file.

3. The article of claim 1 wherein:
the first file comprises an image file;
the index information for the first file provided to the second network node by the first network node comprises a thumbnail image for the image file;
the operation of performing a local search on the second network node only comprises using the thumbnail image provided by the first network node to identify the first file as a remote file of interest to the user of the second network node; and
the operation of using the index information on the second network node for the first file to obtain the first file from the first network node is performed in response to the operation of using the thumbnail image provided by the first network node to identify the first file as a remote file of interest to the user of the second network node.

4. The article of claim 3 wherein:
the index information for the first file further comprises a globally unique identifier for the first file, and the globally unique identifier for the first file comprises a numeric file number for the first file.

5. The article of claim 1 further comprising:
instructions for making the index information for the first file available to the second network node only when a user operating the first network node has a social connection to a user operating the second network node.

6. The article of claim 1 wherein:
the peer to peer file sharing system comprises a third file on the first network node that has not been made available for sharing with either of the second and third network nodes; and
the index information provided to the second network node is a subset of the index information for all files of the peer to peer file sharing system.

7. The article of claim 1 wherein:
the peer to peer network is a subset of a larger network that includes other network nodes outside of the peer to peer network; and
the instructions enable the first network node to perform operations comprising:
providing the index information for the first file to the second network node only, without sharing the index information for the first file to any of the other network nodes in the larger network; and
providing the index information for the second file to the third network node only, without sharing the index information for the second file with any of the other network nodes in the larger network.

8. A computer-implemented method for controlling access to files in a peer to peer file sharing system, wherein each node in the peer to peer file sharing system comprises a processor that executes respective steps of the method, the method comprising:
selecting, by a first network node in the peer to peer file sharing system, a first file to make available for sharing with a second network node in the peer to peer file sharing system, the first file being stored on a file storage system accessible by the first network node, wherein the peer to peer file sharing system comprises the first network node, the second network node, and a third network node;
selecting, by the first network node, a second file to make available for sharing with the third network node, the second file being stored on the file storage system accessible by the first network node;
providing index information for the first file to the second network node only, without broadcasting the index information for the first file to any other network node in the peer to peer file sharing system;
providing index information for the second file to the third network node only, without broadcasting the index information for the second file to any other network node in the peer to peer file sharing system;
after the first network node has provided the index information for the first file to the second network node only, performing a local search on the second network node only, without using services from any other network node, to identify local and remote files of interest to a user of the second network node, wherein the remote files of interest comprise the first file; and
after identifying local and remote files of interest to the user of the second network node, using the index information on the second network node for the first file to obtain the first file from the first network node.

9. The method of claim 8 wherein the index information for the first file comprises a globally unique identifier for the first file, and the globally unique identifier for the first file comprises a numeric file number for the first file.

10. The method of claim 8 wherein:
the first file comprises an image file;
the index information for the first file provided to the second network node by the first network node comprises a thumbnail image for the image file;
the operation of performing a local search on the second network node only comprises using the thumbnail image provided by the first network node to identify the first file as a remote file of interest to the user of the second network node; and
the operation of using the index information on the second network node for the first file to obtain the first file from the first network node is performed in response to the operation of using the thumbnail image provided by the first network node to identify the first file as a remote file of interest to the user of the second network node.

11. The method of claim 8 further comprising:
making the index information for the first file available to the second network node only when a user operating the first network node has a social connection to a user operating the second network node.

12. The method of claim 8 wherein:
the peer to peer file sharing system comprises a third file on the first network node that has not been made available for sharing with either of the second and third network nodes; and
the index information provided to the second network node is a subset of the index information for all files of the peer to peer file sharing system.

13. The method of claim 8 wherein:
the index information for the first file further comprises a globally unique identifier for the first file, and the globally unique identifier for the first file comprises a numeric file number for the first file.

14. The method of claim 8 wherein reception of the index information grants access to the file associated with the index information.

15. The method of claim 8 wherein:
the peer to peer network is a subset of a larger network that includes other network nodes outside of the peer to peer network; and the first network node provides the index information for the first file to the second network node only, without sharing the index information for the first file to any of the other network nodes in the larger network; and the first network node provides the index information for the second file to the third network node only, without sharing the index information for the second file with any of the other network nodes in the larger network.

16. A peer to peer file sharing system comprising:

first, second, and third network nodes in the peer to peer file sharing system; and instructions which, when executed by the first, second, and third network nodes, enable the first, second, and third network nodes to perform operations comprising:

selecting, by the first network node, a first file to make available for sharing with the second network node, the first file being stored on a file storage system accessible by the first network node;

selecting, by the first network node, a second file to make available for sharing with the third network node, the second file being stored on the file storage system accessible by the first network node;

providing index information for the first file to the second network node only, without broadcasting the index information for the first file to any other network node in the peer to peer file sharing system;

providing index information for the second file to the third network node only, without broadcasting the index information for the second file to any other network node in the peer to peer file sharing system;

after the first network node has provided the index information for the first file to the second network node only, performing a local search on the second network node only, without using services from any other network node, to identify local and remote files of interest to a user of the second network node, wherein the remote files of interest comprise the first file; and after identifying local and remote files of interest to the user of the second network node, using the index information on the second network node for the first file to obtain the first file from the first network node.

17. The peer to peer file sharing system of claim 16, wherein the index information for the first file comprises a globally unique identifier for the first file, and the globally unique identifier for the first file comprises a numeric file number for the first file.

18. The peer to peer file sharing system of claim 16, wherein:

the first file comprises an image file;

the index information for the first file provided to the second network node by the first network node comprises a thumbnail image for the image file;

the operation of performing a local search on the second network node only comprises using the thumbnail image provided by the first network node to identify the first file as a remote file of interest to the user of the second network node; and the operation of using the index information on the second network node for the first file to obtain the first file from the first network node is performed in response to the operation of using the thumbnail image provided by the first network node to identify the first file as a remote file of interest to the user of the second network node.

19. The peer to peer file sharing system of claim 18, wherein:

the index information for the first file further comprises a globally unique identifier for the first file, and the globally unique identifier for the first file comprises a numeric file number for the first file.

20. The peer to peer file sharing system of claim 16, wherein:

the peer to peer network is a subset of a larger network that includes other network nodes outside of the peer to peer network; and the instructions enable the first network node to perform operations comprising:

providing the index information for the first file to the second network node only, without sharing the index information for the first file to any of the other network nodes in the larger network; and providing the index information for the second file to the third network node only, without sharing the index information for the second file with any of the other network nodes in the larger network.

* * * * *